United States Patent [19]

Bakta et al.

[11] Patent Number: 5,002,780

[45] Date of Patent: Mar. 26, 1991

[54] MAGNESIUM SALT OF A FATTY ACID ACYL LACTYLATE

[75] Inventors: György Bakta; Sándor Szirmai, both of Budapest, Hungary; Lajos Fath, Luzern, Switzerland; János Pálinká, Budapest, Hungary; Lajos Györy, Budapest, Hungary; Miklós Grósz, Budapest, Hungary

[73] Assignee: Caola Kozmetikai ES Haztartasvegyipari Vallalat, Budapest, Hungary

[21] Appl. No.: 556,877

[22] Filed: Jul. 20, 1990

Related U.S. Application Data

[63] Continuation of Ser. No. 289,340, Dec. 22, 1988, abandoned.

[51] Int. Cl.$^5$ .................. A23D 1/02; A23L 1/304
[52] U.S. Cl. ............................. 426/72; 424/439; 424/441; 424/464; 424/600; 426/74; 514/905

[58] Field of Search ............... 426/2, 74, 72, 311, 426/53, 54, 635, 648; 424/439, 441, 464, 600; 514/905

[56] References Cited

U.S. PATENT DOCUMENTS

| | | | |
|---|---|---|---|
| 2,512,537 | 6/1950 | Zellers | 426/74 |
| 3,443,956 | 5/1969 | Muller | 426/74 |
| 3,852,497 | 12/1974 | Skelcey | 426/74 |
| 4,325,975 | 4/1982 | Lindon | 426/74 |
| 4,853,237 | 8/1989 | Prinkkila | 426/2 |
| 4,859,283 | 8/1989 | Jayawant | 426/653 |

*Primary Examiner*—Carolyn Paden
*Attorney, Agent, or Firm*—Herbert Dubno; Jonathan Myers

[57] ABSTRACT

A dietary supplement is disclosed which comprises: 3 to 8% Vitamin C by weight; 1 to 3% Vitamin E or Vitamin E acetate; and 10 to 29% of a magnesium salt of a fatty acid acyl lactylate. The magnesium salts of the fatty acid acyl lactylate are fat-soluble and permit excellent absorption of magnesium in the human body.

5 Claims, No Drawings

MAGNESIUM SALT OF A FATTY ACID ACYL LACTYLATE

This is a continuation of co-pending U.S. patent application Ser. No. 07/289,340 filed Dec. 22, 1988 which is now abandoned.

FIELD OF THE INVENTION

This invention relates to compositions containing natural vitamins, trace elements and proteins, as well as magnesium.

BACKGROUND OF THE INVENTION

Nowadays there are many diseases that result from dietary deficiencies. In most cases these deficiency diseases can be alleviated or eliminated by the supplement of missing vitamins, trace elements, essential amino acids, etc. However, the uptake of these substances of vital importance with food in not sufficient, if absorption is inhibited for some reason.

The uptake of additional vitamins and compounds providing energy is justified in the case of heavy physical work or rigorous sports activities, but it also is desirable to treat reconvalescent conditions after illness. For example, in the course of rigorous sports activity the body losses due to sweating include not only the water soluble vitamins, but also the electrolytes, calcium, potassium, magnesium, and phosphate, which are very important in the muscle contraction.

The systematic replacement of Mg removed in the sweat is particularly important.

These conditions—increased demand, insufficient uptake and increased secretion—result in vitamin and electrolyte deficiency, which asserts itself in the case of sportsman in decreased performance, loss of training pleasure, decline of concentration and reduced fighting ability.

Uptake of electrolytes and vitamins reduces the risk associated with the increased strain of muscles.

A wide spectrum of such products is offered by the pharmaceutical and chemical industry.

The external appearance may be: tablets, liquids (drinking ampoule), tincture, paste, granulated powder, etc.

The Swiss product, BENEROC containing electrolyte+vitamin is a powdered water-soluble preparation, with the following composition:

| | |
|---|---|
| Calcium | 250 mg |
| Potassium | 100 mg |
| Magnesium | 170 mg |
| Phosphate | 1080 mg |
| Vitamin $B_1$ | 10 mg |
| Vitamin $B_2$ | 15 mg |
| Vitamin $B_6$ | 25 mg |
| Nicotinamide | 20 mg |
| Ca-panthothenate | 20 mg |
| Vitamin C | 500 mg |
| Vitamin E | 50 mg |

In tablet form e.g. the sugar-free tablets named ORANOL are known.

| Oranol sugar-free tablets: | |
|---|---|
| Phosphate | 20 mg |
| Mg-glyceryl-phosphate | 10 mg |
| Vitamin E-acetate | 5 mg |
| Vitamin $B_1$ nitrate | 0.65 mg |
| Vitamin $B_2$ Na-phosphate | 0.75 mg |
| Vitamin $B_6$ | 0.90 mg |
| Vitamin A-palmitate | 1000 IU |
| Vitamin $D_3$ | 115 IU |
| Vitamin $B_{12}$ | 0.002 mg |
| Vitamin C | 20 mg |
| Folic acid | 0.2 mg |
| Nicotinamide | 5.4 mg |
| Ca-panthothenate | 3.0 mg |

Among the powdery and liquid preparations ISO STAR, MINERAL PLUS is a well-known low energy value preparation consisting of:

| | |
|---|---|
| Carbohydrate | 87 mg |
| Sodium | 100 mg |
| Potassium | 800 mg |
| Calcium | 140 mg |
| Magnesium | 300 mg |
| Phosphorus | 340 mg |
| Chloride | 150 mg |
| Vitamin | |
| $B_1$ | 16 mg |
| $B_2$ | 4 mg |
| $B_6$ | 16 mg |
| $B_{12}$ | 5 mg |
| Vitamin C | 75 mg |
| Vitamin E | 25 mg |
| Folic acid | 400 mg |
| Niacine | 15 mg |
| Panthothenic acid | 8 mg | and essential amino acids, e.g. valine, leucine, isoleucine, phenylalanine, tryptophan, threonine, lysine.

From among the capsules comprising natural vegetable oils, e.g. SANHELIOS 333 with garlic oil content, the Hungarian product PEPONNEN with pumpkin oil content are well known products.

HALIBUT C is a capsuled preparation containing fish oil, Vitamin A+D, further Vitamin B originating from wheat germ, Vitamin E originating from soya and Vitamin C originating from hip. APILARNILPROP Roumanian product is a sugarcoated propoils and Royal jelly.

BIO ATHLETIK preparations contain pollen incorporated in honey, Royal jelly and Vitamin C.

The above mentioned preparation is marketed under the name HONIG POLIEN SOFORT-ENERGIE. The Hungarian product PROPUR tablets, comprise propolis extract and 50 mg Vitamin C per tablet.

These preparations are combinations of vitamins, trace elements and complex bioactive compounds —which are both efficient for themselves and which exhibit a synergistic effect in some cases.

The mentioned solutions are not objectionable for themselves, the use value sequence thereof is determined by the location and requirement of application. However, it can be stated, that these preparations contain first of all synthetic vitamins and substances produced by chemical synthesis. The capsuled oils are only true natural products, however, they show the disadvantages of oil capsules, namely the stink of garlic oil, as well as its incompability with water-soluble vitamins and other trace elements.

Production of food compositions containing honey is described in Hungarian Patent Specification No.

179,625. The mixture of powdered milk, honey and vegetable fats is flavored with aromatic substances.

Vitamins, trace elements, and natural vegetable parts are not included. The preparation is suitable to alimentation by means of its varying flavor composition, but not able to reach our aim.

SUMMARY OF THE INVENTION

Based on the knowledge mentioned above we setout to prepare compositions comprising natural vitamins, trace elements and proteins, and Mg, where the biological ingredients are present in native state, i.e. become activated due to the enzyme system of the stomach and utilizable for the organism. They take part in the formation of acid-alkali equilibrium of the organism, in such a way that Mg ions intervene efficiently in metabolism and are present in an easily absorbable from.

The components containing the natural vitamins, trace elements and proteins are of vegetable or animal origin. Vegetable seeds (walnut, sunflower seed, pumpkin, apricot stone, et.) proved to be suitable, particularly pumpkin, the grist of which has been employed in 0 to 50%, vegetable germs, particularly wheat and corn germs, which are employed in a ground state in quantities of 0 to 50%, oils obtained by cold-pressing form the mentioned seeds and vegetable germs, and other plant parts, e.g. from garlic/pumpkin oil, walnut oil, wheat germ oil, corn germ oil, garlic oil, etc. and press residues, which are employed in 0 to 40% or 0 to 20% resp., as well as protein concentrates and protein hydrolysates obtained from animals, of which we emphasize the milk powder and egg-white hydrolysate which are employed in quantities of 0 to 20% in the compositions. The enumerated components are employed for themselves or in various combinations.

A fundamental constituent of compositions according to the invention is the Mg ion, indispensable in view of the normal function of the organism, which is partly or fully applied with the Mg salts of fatty acid-acyllactylates of such fatty acids, especially with Mg stearoyl lactylate, as well as with Mg salts of protein hydrolysates. Fatty acidacyl-lactylates are employed in 10 to 20%, protein hydrolysates in form of its Mg salts in 0 to 10%.

The composition also contains honey (0 to 50%) and/or propolis (0 to 5%), honey and/or pollen (0 to 15%), and/or Royal jelly (0 to 5%) and their combination, resp. In some cases honey is replaced by xylitol (0 to 40%), or sorbitol (0 to 10%).

Further application of Mg-ion (0 to 15%) is provided by organic Mg-compounds, such as Mg-citrate, Mg-gluconate, Mg-lactate, Mg-glyceryl-phosphate, or Mg-asparaginate.

The composition may further include B-carotene an amount of 0 to 0.1%, calcium-panthothenate in an amount of 0 to 0.2%, nicotinic acid amide in an amount of 0 to 0.2% and ester of Vitamin A in an amount of 0 to 0.05% and essential amino acids in an amount of 0 to 10%.

In additional to natural vitamins, the vitamin quantity over the daily requirements—needed in the case of enhanced physical stress—is provided by 3 to 8% Vitamin C and 1 to 3% Vitamin E acetate.

Active ingredients of the compositions are homogenized directly or in the presence of water, and the resulting mixtures are formulated by known technological processes in the form of tablets, capsules, pastes, granulated powder or liquid. The new products prepared according to the invention contain in the lowest dose (e.g. 1 tablet or 1 tea-spoon of paste) vitamins and trace elements in concentrations which correspond to the daily requirement of an adult.

It can be considered an advantage that Mg essential for the organism is contained in easily absorbable form, partly or wholly as Mg salts of fatty acid-acyl-lactylates or protein hydrolysates, resp.

EXAMPLES OF THE COMPOSITION

| Example 1 | W % |
|---|---|
| Crushed pumpkin seed | 50 |
| Powdered milk | 20 |
| Mg-stearoyl-lactylate | 10 |
| Honey | 15 |
| Vitamin C | 4 |
| Vitamin E acetate | 1 |

The dried pumpkin seeds are milled to powder on a knife mill in a way that the milling is stopped prior to oil separation.

The honey is melted with the Mg stearoyl-lactylate, the milled pumpkin seed and powdered milk are added with stirring. To the cold suspension Vitamin C is added in powdered form or in aqueous solution and finally the Vitamin E, is added.

| Example 2 | W % |
|---|---|
| Corn germ crushing | 12 |
| Pumpkin oil | 40 |
| Mg stearoyl-lactylate | 10 |
| Egg-white hydrolysate | 20 |
| Sorbitol | 10 |
| Vitamin C | 5 |
| Vitamin E | 3 |

The pumpkin oil is heated to 40° C. and mixed with the previously melted Mg stearoyl-lactylate. With rapid stirring the sorbitol solution heated to 40° C. is added. The crushed corn germ, and the egg-white hydrolysate are added with slow stirring with a Z-arm stirrer and kneaded into the mass, finally the vitamins are added.

| Example 3 | W % |
|---|---|
| Pumpkin seed press slurry | 20 |
| Milled wheat germ | 50 |
| Mg-lactate | 15 |
| Mg sunflower fatty acid-lactylate | 10 |
| Nicotinamide | 0.2 |
| Ca-pantothenate | 0.2 |
| Vitamin C | 3.6 |
| Vitamin E acetate | 1.0 |

M-sunflower fatty acid-lactylate is melted in the pumpkin seed press slurry. Mg lactylate, then nicotinamide and Ca-pantothenate are added to the thus obtained melt. The mixture is cooled to 30° C., blended with Vitamin C and Vitamin E homogenized in wheat germ flour.

| Example 4 | W % |
|---|---|
| Mg salt of egg-white hydrolysate | 10 |
| Mg stearoyl lactylate | 20 |
| Mg carbonate | 5 |
| Sorbitol | 5 |
| Xylitol | 40 |
| Vitamin C | 8 |

| Example 4 | W % |
|---|---|
| Vitamin E | 2 |

The components are mixed to homogeneous condition, then tabletted or dragged.

| Example 5 | W % |
|---|---|
| Pumpkin seed oil | 20 |
| Garlic oil | 20 |
| Mg stearoyl-lactylate | 20 |
| Mg citrate | 1 |
| Mg lactate | 10 |
| Honey | 20 |
| Vitamin A acyl-lactate | 0.05 |
| β-carotene | 0.01 |
| Vitamin C | 8 |
| Vitamin E acetate | 1 |

The honey is melted with the Mg stearoyl-lactylate, then the mixture of pumpkin seed oil and garlic oil is added. Vitamin C is added at 40° C. to the emulsion, further the Vitamin A ester and the Mg-salts are added. Finaly β-carotene and Vitamin E are added.

| Example 6 | W % |
|---|---|
| Crushed walnut | 20 |
| Garlic oil | 40 |
| Mg stearoyl-lactylate | 5 |
| Mg asparaginate | 15 |
| Royal jelly | 3 |
| Powered milk | 10 |
| Sorbitol | 3 |
| Vitamin C | 3 |
| Vitamin E acetate | 1 |

| Example 7 | W % |
|---|---|
| Crushed sunflower | 40 |
| Maize oil | 10 |
| Mg stearoyl lactylate | 20 |
| Powdered milk | 4 |
| Sorbitol | 10 |
| Royal jelly | 5 |
| Vitamin C | 8 |
| Vitamin E acetate | 3 |
| Flavor | 0.25 |

| Example 8 | W % |
|---|---|
| Pumpkin seed press slurry | 10 |
| Crushed pumpkin seed | 10 |
| Wheat germ oil | 20 |
| Mg stearoyl-lactylate | 20 |
| Mg carbonate | |
| Powdered milk | 10 |
| Mg salt of egg-white hydrolysate | 5 |
| Sorbitol | 10 |
| Royal jelly | 5 |
| Vitamin C | 8 |
| Vitamin E acetate | 2 |

| Example 9 | W % |
|---|---|
| Crushed pumpkin seed | 40 |
| Soy-bean oil | 10 |
| Mixture of essenial amino acids | 5 |
| Mg stearoyl-lactylate | 20 |
| Sorbitol | 10 |
| Royal jelly | 5 |
| Vitamin C | 7 |
| Vitamin E acetate | 3 |

| Example 10 | W % |
|---|---|
| Crushed pumpkin seed | 15 |
| Mg stearoyl-lactylate | 15 |
| Essential amino acids | 10 |
| Mg glyceryl-phosphate | 1 |
| Honey | 30 |
| Propolis | 2 |
| Royal jelly | 2 |
| Pollen | 15 |
| Ca-pantothenate | 0.2 |
| Vitamin C | 8 |
| Vitamin E acetate | 1.8 |

The mixing technology is the same as described above, except that the essential amino acids are added together with the Vitamin E in the last phase of mixing.

We claim:

1. A dietary supplement to maintain vitamin and magnesium levels in the form of a tablet, capsule, paste, granulated powder or liquid, which comprises the following ingredients:
   (a) 3 to 8% Vitamin C by weight;
   (b) 1 to 3% Vitamin E acetate;
   (c) 10 to 20% of a magnesium salt of a fatty acid acyl lactylate;
   (d) 0 to 50% honey;
   (e) 0 to 50% of a vegetable seed grist;
   (f) 0 to 50% of a vegetable germ;
   (g) 0 to 40% of a vegetable oil;
   (h) 0 to 20% of a protein concentrate or protein hydrolysate obtained from an animal;
   (i) 0 to 10% of a magnesium salt of a protein hydrolysate; and
   (j) 0 to 15% of a further magnesium salt selected from the group consisting of magnesium citrate, magnesium gluconate, magnesium lactate, magnesium glyceryl phosphate, and magnesium asparaginate; wherein the amount of the ingredients in the dietary supplement totals 100%.

2. The dietary supplement defined in claim 1 which further comprises the following ingredients:
   (k) 0 to 5% propolis;
   (l) 0 to 15% pollen;
   (m) 0 to 5% Royal jelly;
   (n) 0 to 0.1% beta-carotene;
   (o) 0 to 0.2% calcium pantothenate;
   (p) 0 to 0.2% of at least one B Vitamin; and
   (q) 0 to 10% of an essential amino acid; wherein the amount of ingredients in the dietary supplement totals 100%.

3. The dietary supplement defined in claim 1 wherein the magnesium salt of a fatty acid acyl lactylate is selected from the group consisting of: magnesium stearoyl lactylate and magnesium sunflower fatty acid lactylate.

4. The dietary supplement defined in claim 1 wherein the magnesium salt of a fatty acid acyl lactylate is magnesium stearoyl lactylate.

5. The dietary supplement defined in claim 1 wherein the honey is replaced by xylitol in an amount of 0 to 40% or by sorbitol in an amount of 0 to 10% by weight of the total composition.

* * * * *